United States Patent
Zacharko et al.

(10) Patent No.: US 10,961,838 B2
(45) Date of Patent: Mar. 30, 2021

(54) SYSTEM AND METHOD FOR IMPROVING ROTATING SURVEY ACCURACY

(71) Applicant: Halliburton Energy Servinces, Inc., Houston, TX (US)

(72) Inventors: Jonathan Peter Zacharko, Spring, TX (US); Satish Rajagopalan, Tomball, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 77 days.

(21) Appl. No.: 16/330,684

(22) PCT Filed: Dec. 15, 2016

(86) PCT No.: PCT/US2016/067017
§ 371 (c)(1),
(2) Date: Mar. 5, 2019

(87) PCT Pub. No.: WO2018/111283
PCT Pub. Date: Jun. 21, 2018

(65) Prior Publication Data
US 2020/0003042 A1    Jan. 2, 2020

(51) Int. Cl.
*E21B 44/00* (2006.01)
*E21B 7/04* (2006.01)
(Continued)

(52) U.S. Cl.
CPC ............ *E21B 44/005* (2013.01); *E21B 7/064* (2013.01); *E21B 47/024* (2013.01); *G01V 3/26* (2013.01);
(Continued)

(58) Field of Classification Search
CPC ...... E21B 44/005; E21B 47/02; E21B 47/022; E21B 7/064; E21B 47/024; E21B 47/09;
(Continued)

(56) References Cited

U.S. PATENT DOCUMENTS

| 4,813,274 A | 3/1989 | DiPersio et al. |
| 6,347,282 B2 | 2/2002 | Estes et al. |

(Continued)

FOREIGN PATENT DOCUMENTS

| FR | 2532683 A1 | 3/1984 |
| WO | 2016108901 A1 | 7/2016 |

OTHER PUBLICATIONS

International Search Report & Written Opinion issued for corresponding International Application No. PCT/US2016/067017; dated Sep. 6, 2017 (15 pages).

(Continued)

*Primary Examiner* — Brad Harcourt
(74) *Attorney, Agent, or Firm* — McGuireWoods, LLP

(57) ABSTRACT

The disclosed embodiments include a rotating survey tool. The rotating survey tool includes a first sensor array that in operation collects a first set of survey measurements during a downhole drilling operation. Additionally, the rotating survey tool includes a second sensor array directly coupled to the first sensor array that in operation collects a second set of survey measurements while a drill bit drills during the downhole drilling operation. Further, the second set of survey measurements has a greater base accuracy than the first set of survey measurements.

20 Claims, 3 Drawing Sheets

(51) Int. Cl.
*E21B 7/06* (2006.01)
*E21B 47/024* (2006.01)
*G01V 3/26* (2006.01)
*G01V 11/00* (2006.01)
*G01V 13/00* (2006.01)
*E21B 47/09* (2012.01)
*G01C 19/02* (2006.01)

(52) U.S. Cl.
CPC ............ *G01V 11/002* (2013.01); *G01V 13/00* (2013.01); *E21B 47/09* (2013.01); *G01C 19/02* (2013.01)

(58) Field of Classification Search
CPC .......... E21B 7/06; G01V 3/26; G01V 11/002; G01V 13/00; G01C 19/02
See application file for complete search history.

(56) References Cited

U.S. PATENT DOCUMENTS

| | | | |
|---|---|---|---|
| 7,168,507 | B2 | 1/2007 | Downton |
| 2002/0112887 | A1 | 8/2002 | Harrison |
| 2003/0209365 | A1 | 11/2003 | Downton |
| 2007/0235226 | A1 | 10/2007 | Wright et al. |
| 2011/0015862 | A1 | 1/2011 | Sato et al. |
| 2015/0027779 | A1 | 1/2015 | Sugiura et al. |
| 2016/0333682 | A1 | 11/2016 | Griffing et al. |
| 2018/0051551 | A1* | 2/2018 | Jeffryes ................ E21B 47/024 |

OTHER PUBLICATIONS

Wang, et al. "Rotary In-Drilling Alignment using an Autonomous MEMS-Based Inertial Measurement Unit for Measurement-While-Drilling Processes"; IEEE Instrument & Measurement Magazine; vol. 16, No. 6 (Dec. 1, 2013).

Supplementary European Search Report dated Sep. 24, 2019, issued in European Patent Application No. 16 92 4044.

Office Action dated Jun. 19, 2019 in by the French Patent Office in French Patent Application No. 1760630.

* cited by examiner

SYSTEM AND METHOD FOR IMPROVING ROTATING SURVEY ACCURACY

BACKGROUND

The present disclosure relates generally to rotating survey measurements during drilling of a wellbore, and more specifically to providing measurements of a drilling tool or measurement while drilling (MWD) tool such as revolutions per minute (RPM), azimuth, magnetic and/or gravity tool face, and gravity inclination of a bottom hole assembly (BHA) with improved accuracy.

While drilling a well, some high bandwidth sensors, which are generally less accurate than lower bandwidth counterparts, are used in performing rotating survey measurements. The rotating survey measurements provide a steering system of the BHA with a location and heading direction of a drill bit within the well. The high bandwidth sensors may experience non-repeatable errors, random scale errors, and bias drift errors due to thermal cycling and aging experienced by the sensors, which may result in inaccurate measurements of the location of the drill bit. However, the high bandwidth sensors may generally produce reliable rotating survey measurements in harsh environments experienced during drilling at a position along a drill string near a drill bit.

To combat accuracy problems of the high bandwidth sensors, low bandwidth sensors with greater accuracy may be applied along a drill string to replace the high bandwidth sensors. Alternatively, the low bandwidth sensors may be applied along the string in a position remote from the high bandwidth sensors. While the low bandwidth sensors have a greater accuracy, the low bandwidth sensors may be susceptible to errors resulting from the harsh environments experienced during drilling.

BRIEF DESCRIPTION OF THE DRAWINGS

Illustrative embodiments of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the disclosed subject matter, and it is understood that other embodiments may be utilized and that logical structural, mechanical, electrical, and chemical changes may be made without departing from the spirit or scope of the disclosure. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to". Unless otherwise indicated, as used throughout this document, "or" does not require mutual exclusivity.

The present disclosure relates to enhancing rotating survey accuracy for a downhole surveying tool. More particularly, the present disclosure relates to calibrating a high bandwidth sensor using data gathered from a low bandwidth sensor to increase surveying accuracy while drilling. The presently disclosed embodiments may be used in horizontal, vertical, deviated, or otherwise nonlinear wellbores in any type of subterranean formation. Embodiments may include sensors of varying ranges and types to provide an accurate position of a drill bit while drilling a wellbore.

Figure 1:
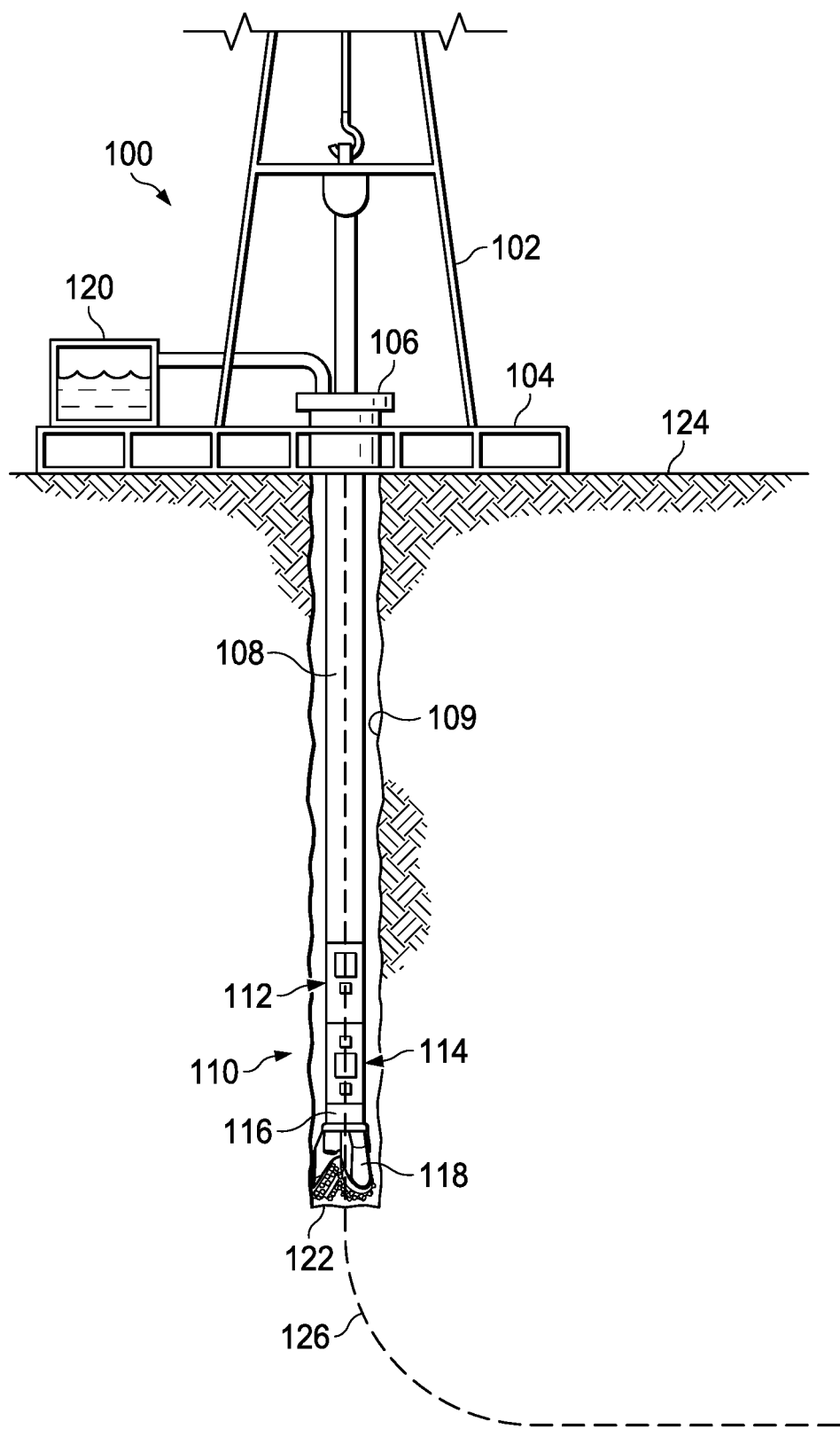
FIG. 1 is a schematic view of a drilling system within a well.

Referring to FIG. 1, a schematic view of a drilling system 100 is illustrated. The drilling system 100 includes a derrick 102 that is buttressed by a derrick floor 104. The derrick floor 104 supports a rotary table 106 that is driven during drilling at a desired rotational speed, for example, via a chain drive system through operation of a prime mover (not shown). The rotary table 106, in turn, provides the rotational force to a drill string 108 within a wellbore 109. The drill string 108, as illustrated, is coupled to a bottom hole assembly (BHA) 110. In the illustrated embodiment, the BHA 110 includes a high bandwidth sensor array 112, a low bandwidth sensor array 114, a steering system 116, and a drill bit 118.

The drilling system 100 also includes a drilling fluid reservoir 120. The drilling fluid reservoir 120 provides drilling fluid (e.g., drilling mud) through the drill string 108 to the BHA 110. The drilling fluid may continuously circulate through drill string 108, to an end 122 of the wellbore 109, and back to a surface 124. Further, the drilling fluid provides hydrostatic pressure that prevents formation fluids from entering into the wellbore 108, keeps the drill bit cool and clean, and carries out drill cuttings during a drilling process. When a mud motor is present in the BHA 110, the flow of drilling fluid through the drill string 108 generates power at the BHA 110. In some embodiments, the power generated at the BHA 110 provides power to the high bandwidth sensor array 112, the low bandwidth sensor array 114, and the steering system 116.

In an embodiment, the steering system 116 provides steering control to the drill bit 118. For example, a target path 126 is programmed into the steering system 116 prior to commencing a drilling operation of the wellbore 109. The target path 126 may be embodied as instructions stored in a memory of the steering system 116, and a processor of the steering system 116 executes the instructions to control the direction of drilling by the drill bit 118. The high bandwidth sensor array 112 and the low bandwidth sensor array 114 provide survey data to the steering system 116 during the drilling operation that provides an indication of a location of the drill bit 118 during the drilling process. The steering system 116 uses this data to maintain the drill bit 118 on the target path 126 or to realign the drill bit 118 to the target path when the steering system 118 receives an indication that the drill bit 118 has drifted from the target path 126.

The high bandwidth sensor array 112 may include one or more sensors, as discussed in further detail below with reference to FIG. 3. The one or more sensors may include accelerometers, gyroscopes, and magnetometers that, when used in varying combinations, provide an indication of the location of the drill bit 118. Further, the low bandwidth sensor array 114 may include similar sensors with heightened sensitivities, for example. It may be appreciated that the low bandwidth sensor array 114 may generally include a smaller dynamic range than the high bandwidth sensor array 112. Having the smaller dynamic range may make the low bandwidth sensor array 114 better suited for lower bandwidth measurements than the high bandwidth sensor array 112.

The high bandwidth sensor array 112 may have a lower base accuracy than the low bandwidth sensor array 114. Accordingly, measurements from the low bandwidth sensor array 112 may be used by the steering system 116 to correct the less accurate measurements of the high bandwidth sensor array 114. Further, as the low bandwidth sensor array 114 is prone to errors resulting from the hostile drilling environment, measurements from the low bandwidth sensor array 114 may only be used in correcting the measurements of the high bandwidth sensor array 112 when certain drilling criteria are established. For example, the measurements are collected by the low bandwidth sensor array 114 and used to correct the measurements of the high bandwidth sensor array 112 when drilling is stopped (e.g., when new sections of the drill string 108 are installed), when RPM of the drill string 108 are constant, and/or when vibration of the drill string 108 is below a threshold. In contrast, the high bandwidth sensor array 112 may continue taking measurements under drilling conditions without losing accuracy as a result of the hostile drilling environment.

Figure 2:
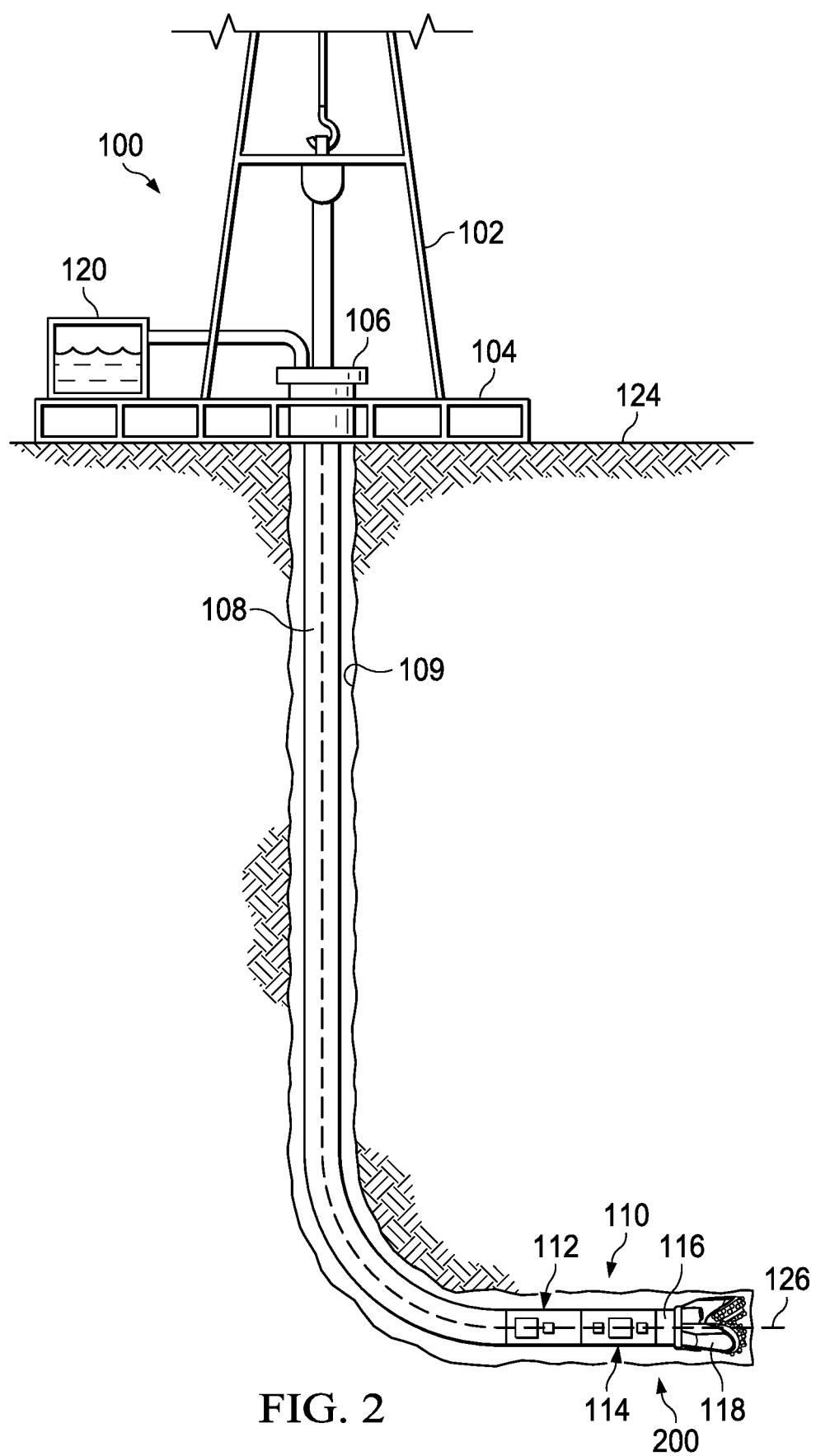
FIG. 2 is a schematic view of the drilling system of FIG. 1 while drilling horizontally.

FIG. 2 is a schematic view of the drilling system 100 after extending the wellbore 109 in a horizontal direction to generate a horizontal portion 200 of the wellbore 109. As discussed above with reference to FIG. 1, the steering system 116 uses measurements from the high bandwidth sensor array 112 and the low bandwidth sensor array 114 to maintain the drill bit 118 along the target path 126 of the wellbore 109. The steering system 116 may continue to dynamically alter the course of the drill bit 118 to maintain the trajectory of the target path 126 based on the survey measurements of the high bandwidth sensor array 112 and the low bandwidth sensor array 114.

While the measurements from the high bandwidth sensor array 112 and the low bandwidth sensor array 114 are continuously provided to the steering system 116 to steer the drill bit 118, the high bandwidth sensor array 112 and the low bandwidth sensor array 114 also provide the measurements to the surface 124 periodically. Because bandwidth to send data to the surface 124 is limited, the high bandwidth sensor array 112 and the low bandwidth sensor array 114 may provide data to the surface 124 at preset intervals. For example, the high bandwidth sensor array 112 and the low bandwidth sensor array 114 may provide an update to the surface 124 every ten minutes. It may be appreciated that the high bandwidth sensor array 112 and the low bandwidth sensor array 114 may also provide updates more or less frequently depending on parameters set by an operator of the drilling system 100. The periodic updates may be used by the operator to ensure that the steering system 116 is maintaining the target path 126. Further, the periodic updates may be a mechanism for the operator to ensure that the high bandwidth sensor array 112 and the low bandwidth sensor array 114 are both functioning properly.

Figure 3:
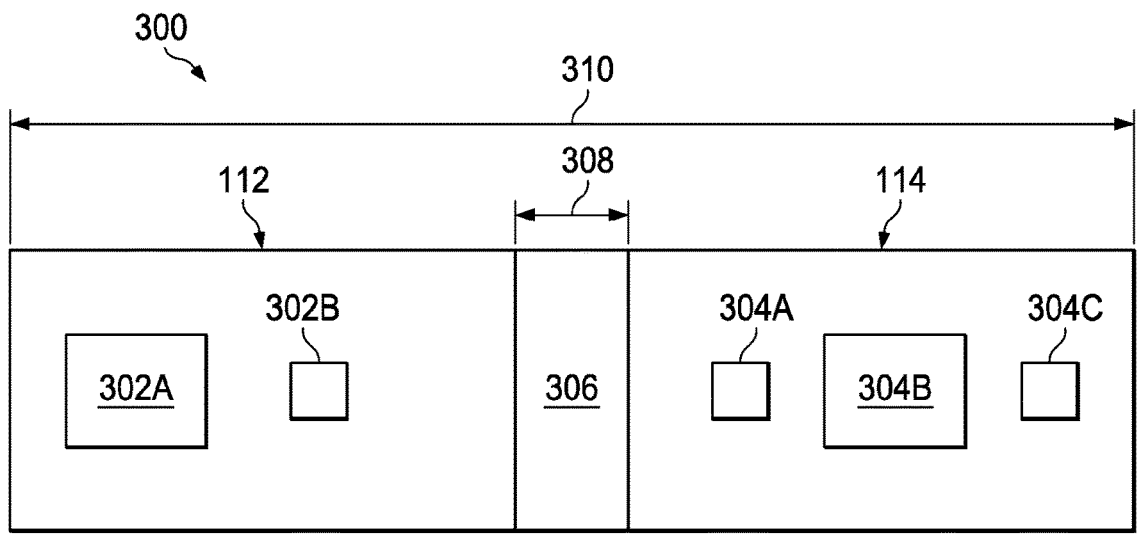
FIG. 3 is a schematic view of a sensor system.

Referring to FIG. 3, a schematic view of a sensor system 300 is depicted. The sensor system 300 (i.e., a rotating survey tool) includes the high bandwidth sensor array 112 and the low bandwidth sensory array 114. As illustrated, the high bandwidth sensor array 112 includes sensors 302A and 302B. The sensors 302A and 302B may be accelerometers, such as quartz hinge accelerometers or microelectromechanical systems (MEMS) accelerometers. Further, the sensors 302A and 302B may be gyroscopes (e.g., MEMS bases gyroscopes) or magnetometers (e.g., flux gate, Hall effect, magnetoresistive, or Lorentz force based MEMS devices). Any combination of accelerometers, gyroscopes, and magnetometers is also contemplated as making up the sensors 302A and 302B.

The high bandwidth sensor array 112 includes a lower base accuracy than the low bandwidth sensor array 114. The sensors 302A and 302B of the high bandwidth sensor array 112 may also be prone to errors due to thermal cycling and aging. However, the high bandwidth sensor array 112 is capable of providing measurements under drilling conditions. More accurate sensors 304A, 304B, and 304C of the low bandwidth sensor array 114 may be used periodically to calibrate the sensors 302A and 302B of the high bandwidth sensor array 112. The sensors 304A, 304B, and 304C may also be a combination of accelerometers, gyroscopes, and magnetometers. Further, while the low bandwidth sensor array 114 is depicted with the three sensors 304A, 304B, and 304C, and the high bandwidth sensor array 112 is depicted with the two sensors 302A and 302B, any number of sensors may be used in the low bandwidth sensor array 114 and the high bandwidth sensor array 112.

In an embodiment, a space 306 is provided between the high bandwidth sensor array 112 and the low bandwidth sensor array 114. In operation, a width 308 of the space 306 may be minimized as much as possible such that three-dimensional vectors of all of the sensors 302A, 302B, 304A, 304B, and 304C are substantially the same. That is, the sensors 302A, 302B, 304A, 304B, and 304C, at any given moment, are all providing survey measurements at generally the same location within the wellbore 109 at the same time. Further, to ensure that the sensors 302A, 302B, 304A, 304B, and 304C all have the same three-dimensional vectors, a length 310 of the sensing system 300 may be less than six feet. In some embodiments, depending on a size and number of the sensors 302A, 302B, 304A, 304B, and 304C, it is contemplated that the length 310 may be slightly larger than six feet.

As mentioned above, the high bandwidth sensor array 112 may operate properly under any drilling environment. For example, the high bandwidth sensor array 112 may perform within specified accuracy ranges regardless of the vibration on the drill string 108. In contrast, the low bandwidth sensor array 112 may operate properly when a vibration level on the drill string 108 is sufficiently low. The low bandwidth sensor array 112 may perform sufficiently when the average vibration levels experienced by the low bandwidth sensor array 112 are less than a 3 g average vibration in addition to 1 g of gravity. Accordingly, the low bandwidth sensor array 112 may generally conduct useful measurements when the RPM of the drill bit 118 is substantially constant, when the average vibration is below the 3 g average vibration threshold, or some combination thereof. As used herein, the term "substantially constant" may mean that the RPM of the drill bit 118 stays within a specified percentage of a base RPM value. For example, "substantially constant" may mean that the RPM of the drill bit 118 does not drift more than 5% from the base RPM value. Additionally, it may be appreciated that the 5% threshold is used as an example, and the specified percentage of the base RPM value may be greater or smaller than 5% depending on the specific sensors 304A, 304B, and 304C used in the low bandwidth sensor array 114.

Because the accuracy of the high bandwidth sensor array 112 is not as precise as the accuracy of the low bandwidth sensor array 114, a comparison of the measurements collected by both the high bandwidth sensor array 112 and the low bandwidth sensor array 114 reveals a numerical value of error with the measurements of the high bandwidth sensor array 112. The steering system 116, for example, receives and compares the measurements from both the high bandwidth sensor array 112 and the low bandwidth sensor array 114 to determine the error value. Once the error value is computed, the steering system 116 applies corrections to the high bandwidth sensor array 112 to improve the accuracy of the measurements of the high bandwidth sensor array 112. Further, in an embodiment, the steering system 116 uses the corrected measurements of the high bandwidth sensor array 112 to steer the drill bit 118 along the target path 126. Applying the corrections to the high bandwidth sensor array 112 may also be referred to as calibrating the high bandwidth sensor array 112.

Various embodiments may be used to combine the high bandwidth sensor array 112 and the low bandwidth sensor array 114. As depicted in FIG. 3, the high bandwidth sensor array 112 and the low bandwidth sensor array 114 are stacked close enough together that the high bandwidth sensor array 112 and the low bandwidth sensor array 114 measure the same three-dimensional vector. In another embodiment, a single sensor array 112 or 114 is used to perform both the high bandwidth and low bandwidth measurements. For example, the quality of the measurement by the single sensor array 112 or 114, in such an embodiment, is sufficient to cover the requirements of both the low bandwidth and high bandwidth surveys. Sensor domains, such as magnetic measurements and acceleration values, may be treated differently. That is, the single sensor array 112 or 114 may have a single magnetometer for both high bandwidth and low bandwidth surveying and separate sets of accelerometers for the high bandwidth and low bandwidth surveying. Alternatively, the single sensor array may have a single accelerometer for both high bandwidth and low bandwidth surveying and separate sets of magnetometers for the high bandwidth and low bandwidth surveying.

Another embodiment involves employing sensors 302A, 302B, 304A, 304B, 304C, or any combination thereof with each employed sensor including multiple ranges of use. For example, a sensor 302 or 304 may be an accelerometer that is configured to include both a low g-range and a larger dynamic g-range. The low g-range of the sensor 302 or 304 may be used when a sensed vibration on the drill string 108 is below a 3 g average vibration threshold. Likewise, the larger dynamic g-range of the sensor 302 or 304 may be used when the vibration on the drill string 108 exceeds the 3 g average vibration threshold to account for vibration, tool dynamics with a different performance, or both. By employing sensors 302 or 304 that are able to measure in multiple ranges, the sensors 302 or 304 provide multiple ranges of measurements from a single measuring point. By way of example, the low g-range of the sensor 302A may be a 5 g range while the large dynamic g-range of the sensor 302A may be an 18 g range. In another embodiment, the low g-range of the sensor 302A measuring a down tool axis, which generally sees lower vibration than a measurement in a rotational plane, may be a 2 g range while the large dynamic g-range of the sensor 302A may be a 5 g range. In yet another embodiment, the low g-range of a sensor measuring in the rotational plane may be a 5 g range while the large dynamic g-range of the sensor 302A may be a 10 g range. Other ranges are also contemplated. For example, the low g-range of the sensor 302A may extend down to any level that is sufficient to take accurate measurements when little or no vibration is present on the drill string 108. Such a low g-range may generally be scaled to around a ±2 g range. Further, the large dynamic g-range of the sensor 302A may extend up to any level that is still able to take sufficiently accurate measurements during any drilling operation.

Such a sensor may switch between the multiple ranges of use based on the drilling conditions. Drilling conditions that produce more than a 3 g average vibration on the drill string 108 may use the large dynamic g-range of the sensor 302 or 304, while conditions that produce less than the 3 g average vibration on the drill string 108 may use the low g-range of the sensor 302 or 304. Other thresholds larger and smaller than the 3 g average vibration are also contemplated. Additionally, the sensor 302 or 304 may include more than two ranges. Accordingly, the sensor 302 or 304 may switch between the ranges at more than one vibration threshold.

Furthermore, multiple sensors may be used in a single sensor array to cover both the low g-ranges and the large dynamic g-ranges. For example, a single sensor 302 or 304 may be employed with a low g-range and multiple sensors 302 or 304 may be employed with the large dynamic g-ranges. Further, in some embodiments, it is contemplated that a single sensor 302 or 304 with the large dynamic g-range is employed in the single sensor array, while multiple sensors 302 or 304 with the low g-range are employed within the single sensor array.

It may also be appreciated that the sensors 302 and 304 can provide redundancy to the system. For example, if the low bandwidth sensors 304 stop functioning properly, the high bandwidth sensor 302 may still provide usable data about the location of the drill bit 118. Accordingly, multiple sensors of the same type with different ranges may be employed within the high bandwidth sensor array 112 and the low bandwidth sensor array 114. Further, when all of the sensors 302 and 304 appear to be operational, values from redundant sensors may be used as a quality check, or a figure of merit calculation for the primary sensors to determine a degradation or non-functionality of the primary sensors (e.g., a 5 g range sensor and an 18 g range sensor for an accelerometer). The redundant sensors may be applied or ignored depending on the drilling environment. For example, in a magnetically poor environment, the magnetometers could be excluded from vector calculation.

Algorithms may be used when multiple types of sensors are deployed to achieve sensor fusion. Sensor fusion, as used herein, refers to processing data from several different sensors 302 and 304 to achieve a more complete measurement than what can be measured from a single sensor alone. An example of the algorithms that may be employed includes correcting a gyroscope scale by detecting an absolute number of rotations over a pre-determined period from a magnetic or gravity tool face sensor. In another embodiment, a gyroscope bias is removed by sampling a static value when a determination is made by other sensors 302 and 304 that the BHA 110 is not rotating. Further, rotating sensor scale of the high bandwidth sensor array 112 may be determined by low vibration total field measurements provided by the low bandwidth sensor array 114. Additionally, a rotating sensor bias of the high bandwidth sensor array 112 may be determined by averaging over complete rotations, which is determined by observing other sensors 302 and 304 or the data itself. For example, correcting the rotating sensor bias may involve fitting data to a sine wave produced by the other sensors 302 and 304. Further, the rotating sensor bias and scale of the high bandwidth sensor array 112 may be corrected for stationary measurements when the BHA 110 stops rotating.

All of the sensor data from all of the sensors 302 and 304 may be combined into a single algorithm to determine precise measurements of the vector quantities of the drill bit 118. For example, the steering system 116 may use statistical filtering of data using Kalman filters to determine the precise vector quantities where the multiple sensors 302 and 304, which are in potentially different domains, are all measuring the same physical motion. Further, physical models of the BHA 110 and steering of the drill bit 118 may be incorporated to better predict and estimate the actual position of the drill bit 118. For example, it is known that the drill bit 118 must follow a certain well path, which is governed by a current position of the drill bit 118 and steering control provided by the steering system 116. Accordingly, the physical models may be used to establish a better measurement of where the drill bit 118 is based on the steering commands of the steering system 116 to the drill bit 118. The physical models may be compared to measurements of the high bandwidth sensor array 112 to determine and correct for errors of the measurements of the high bandwidth sensor array 112.

Correction and fusion algorithms, as discussed above, may be run in real time by a processor within the steering system 116 while drilling. Additionally, the data collected by the sensors 302 and 304 may be sent to the surface 124 for post-drilling processing. The data may be transmitted to the surface 125 using a data transmission scheme, such as a mud pulse telemetry scheme. Further, in an embodiment, the data may be stored in a memory at the steering system 116, for example, and analyzed at the surface 124 when the drill string 108 is removed from the wellbore 109. For post-drilling processing, the data is used to generate and log a precise path of the wellbore 109. This information may be used when drilling other wellbores in the vicinity of the wellbore 109 to avoid any potential interference between the wellbores.

Figure 4:
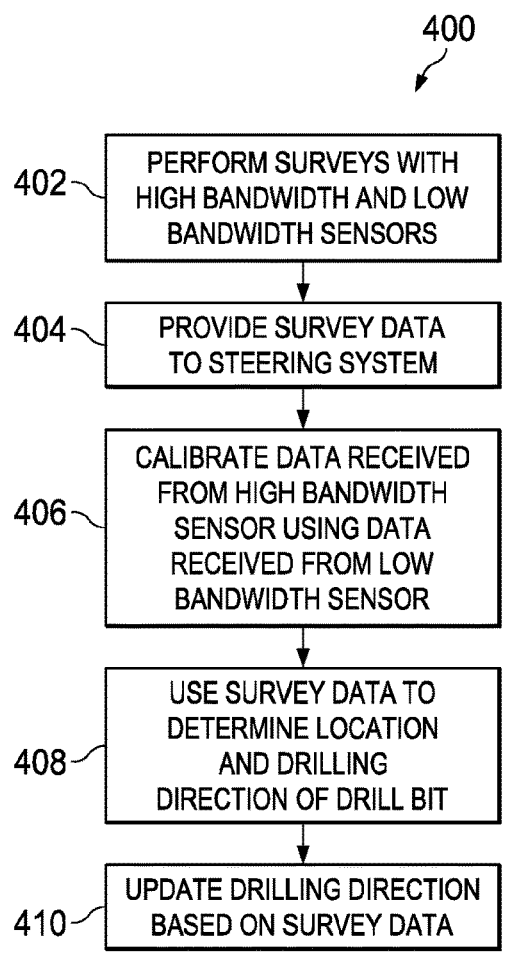
FIG. 4 is a flow chart of a method for steering the drilling system of FIG. 1.

FIG. 4 is a flow chart of a method 400 for steering the drilling system 100. Initially, at block 402, surveys are performed with the high bandwidth sensor array 112 and the low bandwidth sensor array 114 to determine a below surface location and heading of the drill bit 118. As discussed above with reference to FIG. 3, the high bandwidth sensor array 112 provides survey measurements that are not corrupted by vibration of a drilling operation, but the resolution and accuracy of the survey measurements may be limited. The low bandwidth sensor array 114 provides greater resolution and accuracy than the high bandwidth sensor array 112, but the low bandwidth sensor array 114 may be susceptible to corruption from the vibration of the drilling operation. It may also be appreciated that high bandwidth sensors and low bandwidth sensors may also be disposed within a single sensor array, and, in an embodiment, a single sensor is capable of alternating between both a high bandwidth measurement and a low bandwidth measurement depending on the drilling conditions.

At block 404, survey data collected at block 402 is provided to the steering system 116. The steering system 116 uses the data to track where the drill bit 118 has drilled the wellbore 109, and control the drill bit 118 to maintain the drill bit 118 along the target path 126. Additionally, in an embodiment, the steering system 116 stores the survey data in a memory of the steering system 116 to be post-processed and used at the surface 124 to provide a precise record of the location of the wellbore 109.

Subsequently, at block 406, the steering system 116 calibrates the survey data received from the high bandwidth sensor array 112 using the survey data received from the low bandwidth sensor array 114. Because the high bandwidth sensor array 112 may be susceptible to non-repeatable errors, random scale errors, and bias drift errors due to thermal cycling and aging, calibration of the high bandwidth sensor array 112 may be desirable at regular intervals. Accordingly, the survey data received from the low bandwidth sensor array 114, which is not as susceptible to such errors, is compared with the survey data from the high bandwidth sensor array 112 to remove error bias from the survey data of the high bandwidth sensor array 112.

The periodic calibration of the high bandwidth sensor array 112 may occur at any time the low bandwidth sensor array 114 is able to generate accurate survey data. In an embodiment, the low bandwidth sensor array 114 is able to provide the steering system 116 with accurate survey data when the vibration on the low bandwidth sensor array 114, which includes an accelerometer with a 5 g range, is less than a 3 g average vibration in addition to the 1 g provided by gravity. Such a vibration range may occur when the drill bit 118 is not drilling, when the drill bit 118 is drilling through a portion of a formation that enables the drill bit 118 to maintain a substantially constant RPM, when the drill bit 118 maintains a low RPM while drilling (e.g., less than 10 RPM), or any combination thereof.

Subsequently, at block 408, the calibrated survey data is used to determine a location and drilling direction of the drill bit 118. In an embodiment, the steering system 116 uses this information to maintain the drill bit 118 along the target path 126. Further, the steering system 116 may store the calibrated survey data in the memory of the steering system 116 for post processing and logging at the surface 124. The logged data may be used when drilling other wellbores to avoid any contact with the wellbore 109.

At block 410, the steering system 116 uses the calibrated survey data to update a drilling direction of the drill bit 118. The drilling direction is updated to maintain the drill bit 118 along the target path 126, or to direct the drill bit 118 back to the target path 126. Additionally, the calibrated survey data provides greater accuracy in determining the actual location of the drill bit 118 than with just the uncalibrated survey data provided by the high bandwidth sensor array 112 or the survey data of the low bandwidth sensor array 114.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowchart depicts a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure:

Clause 1, a rotating survey tool, comprising: a first sensor array configured to collect a first set of survey measurements during a downhole drilling operation; and a second sensor array directly coupled to the first sensor array and configured to collect a second set of survey measurements while a drill bit drills during the downhole drilling operation, wherein the second set of survey measurements has a greater base accuracy than the first set of survey measurements.

Clause 2, the rotating survey tool of clause 1, comprising a steering system communicatively coupled to the first sensor array and the second sensor array, wherein the steering system is configured to receive the first set of survey measurements and the second set of survey measurements and to steer the drill bit based on the first set of survey measurements and the second set of survey measurements.

Clause 3, the rotating survey tool of clause 2, wherein the steering system is configured to calibrate the first sensor array based on the second set of survey measurements, and to steer the drill bit based on the first set of survey measurements after the first sensor array is calibrated.

Clause 4, the rotating survey tool of at least one of clauses 1-3, wherein the first sensor array and the second sensor array each comprise an accelerometer, a magnetometer, a gyroscope, or any combination thereof.

Clause 5, the rotating survey tool of at least one of clauses 1-4, wherein the first sensor array comprises two or more sensors of a single type, each of the two or more sensors of the single type comprising a different accuracy range from each other.

Clause 6, the rotating survey tool of at least one of clauses 1-5, wherein the second sensor array comprises two or more sensors of a single type, each of the two or more sensors of the single type comprising a different accuracy range from each other.

Clause 7, the rotating survey tool of at least one of clauses 1-6, wherein the first sensor array comprises an accelerometer with an 18 g range, and the second sensor array comprises an accelerometer with a 5 g range.

Clause 8, the rotating survey tool of at least one of clauses 1-7, wherein the first sensor array comprises a sensor that is configurable to have multiple ranges, and the sensor is configured to switch between the multiple ranges based on drilling conditions of the drilling operation.

Clause 9, the rotating survey tool of at least one of clauses 1-8, wherein the first sensor array and the second sensor array are configured to take survey measurements of a same three-dimensional vector at a same moment in time.

Clause 10, the rotating survey tool of at least one of clauses 1-9, wherein the first set of survey measurements and the second set of survey measurements are stored in a memory for post-processing at a surface of a well to provide a precise record of locations of drilling during the drilling operation.

Clause 11, a method for performing a survey of a location within a wellbore during a drilling operation, comprising: receiving a first set of survey measurements from a first sensor array during the drilling operation; receiving a second set of survey measurements from a second sensor array while a drill bit drills during the drilling operation, wherein the second set of survey measurements has a greater base accuracy than the first set of survey measurements and wherein the first sensor array and the second sensor array each measure a single three-dimensional vector during a single time instance; and calibrating the first sensor array with the second set of survey measurements from the second sensor array.

Clause 12, the method of clause 11, wherein calibrating the first sensor array comprises using a Kalman filter to combine measurements of a same physical motion from multiple sensors into a single measurement.

Clause 13, the method of clause 11 or 12, wherein calibrating the first sensor array comprises comparing the first set of survey measurements to a physical model based on steering commands provided to a drill bit and correcting errors of the first sensor array based comparing the first set of survey measurements to the physical model.

Clause 14, the method of at least one of clause 11-13, comprising: storing the first set of survey measurements in a memory after calibrating the first sensor; and post-processing the first set of survey measurements at a surface of a well to provide a precise record of locations of drilling during the drilling operation.

Clause 15, the method of at least one of clauses 11-14, wherein the second set of survey measurements are recorded when the drilling operation produces a vibration on the drill string of less than a 3 g average vibration.

Clause 16, the method of at least one of clauses 11-15, wherein only a portion of the second set of survey measurements are used to calibrate the first sensor array, and the portion of the second set of survey measurements comprises the survey measurements received when the drilling operation produces a vibration on the drill string of less than a 3 g average vibration.

Clause 17, A method for correcting a drilling path during a drilling operation, comprising: receiving a first set of survey measurements from a first sensor during the drilling operation; receiving a second set of survey measurements from a second sensor while a drill bit drills during the drilling operation, wherein the second set of survey measurements has a greater base accuracy than the first set of survey measurements and wherein the first sensor and the second sensor are disposed on a drill string at a same location; calibrating the first sensor with the second set of survey measurements from the second sensor; and correcting a drilling path of the drill bit based on the first set of survey measurements after calibrating the first sensor.

Clause 18, the method of clause 17, comprising switching from the first sensor to the second sensor to receive the second set of survey measurements, wherein a single measuring point provides both the first set of survey measurements and the second set of survey measurements depending on whether switching from the first sensor to the second sensor has occurred.

Clause 19, the method of clauses 17 or 18, wherein correcting the drilling path comprises instructing the drill bit to change a drilling angle based on the first set of survey measurements received after calibrating the first sensor.

Clause 20, the method of at least one of clauses 17-19, wherein receiving the second set of survey measurements occurs while the drilling operation produces a vibration on the drill string of less than a 3 g average vibration.

While this specification provides specific details related to survey measurements of a wellbore, it may be appreciated that the list of components is illustrative only and is not intended to be exhaustive or limited to the forms disclosed. Other components related to the survey measurements and drill steering will be apparent to those of ordinary skill in the art without departing from the scope and spirit of the disclosure. Further, the scope of the claims is intended to broadly cover the disclosed components and any such components that are apparent to those of ordinary skill in the art.

It should be apparent from the foregoing disclosure of illustrative embodiments that significant advantages have been provided. The illustrative embodiments are not limited solely to the descriptions and illustrations included herein and are instead capable of various changes and modifications without departing from the spirit of the disclosure.

What is claimed is:

1. A rotating survey tool, comprising:
   a first sensor array configured to collect a first set of survey measurements during a downhole drilling operation; and
   a second sensor array directly coupled to the first sensor array and configured to collect a second set of survey measurements while a drill bit drills during the downhole drilling operation, wherein the second set of survey measurements has a greater base accuracy than the first set of survey measurements, wherein the second sensor array comprises two or more sensors of a single type, each of the two or more sensors of the single type comprising a different accuracy range from each other.

2. The rotating survey tool of claim 1, comprising a steering system communicatively coupled to the first sensor array and the second sensor array, wherein the steering system is configured to receive the first set of survey measurements and the second set of survey measurements and to steer the drill bit based on the first set of survey measurements and the second set of survey measurements.

3. The rotating survey tool of claim 2, wherein the steering system is configured to calibrate the first sensor array based on the second set of survey measurements, and to steer the drill bit based on the first set of survey measurements after the first sensor array is calibrated.

4. The rotating survey tool of claim 1, wherein the first sensor array and the second sensor array each comprise an accelerometer, a magnetometer, a gyroscope, or any combination thereof.

5. The rotating survey tool of claim 1, wherein the first sensor array comprises two or more sensors of a single type, each of the two or more sensors of the single type comprising a different accuracy range from each other.

6. The rotating survey tool of claim 1, wherein the first sensor array comprises an accelerometer with an 18 g range, and the second sensor array comprises an accelerometer with a 5 g range.

7. The rotating survey tool of claim 1, wherein the first sensor array comprises a sensor that is configurable to have multiple ranges, and the sensor is configured to switch between the multiple ranges based on drilling conditions of the drilling operation.

8. The rotating survey tool of claim 1, wherein the first sensor array and the second sensor array are configured to take survey measurements of a same three-dimensional vector at a same moment in time.

9. The rotating survey tool of claim 1, wherein the first set of survey measurements and the second set of survey measurements are stored in a memory for post-processing at a surface of a well to provide a precise record of locations of drilling during the drilling operation.

10. A method for performing a survey of a location within a wellbore during a drilling operation, comprising:
    receiving a first set of survey measurements from a first sensor array during the drilling operation;
    receiving a second set of survey measurements from a second sensor array while a drill bit drills during the drilling operation, wherein the second set of survey measurements has a greater base accuracy than the first set of survey measurements and wherein the first sensor array and the second sensor array each measure a single three-dimensional vector during a single time instance; wherein the second set of survey measurements are recorded when the drilling operation produces a vibration on the drill string of less than a 3 g average vibration, and
    calibrating the first sensor array with the second set of survey measurements from the second sensor array.

11. The method of claim 10, wherein calibrating the first sensor array comprises using a Kalman filter to combine measurements of a same physical motion from multiple sensors into a single measurement.

12. The method of claim 10, wherein calibrating the first sensor array comprises comparing the first set of survey measurements to a physical model based on steering commands provided to a drill bit and correcting errors of the first sensor array based comparing the first set of survey measurements to the physical model.

13. The method of claim 10, comprising:
    storing the first set of survey measurements in a memory after calibrating the first sensor; and
    post-processing the first set of survey measurements at a surface of a well to provide a precise record of locations of drilling during the drilling operation.

14. The method of claim 10, wherein only a portion of the second set of survey measurements are used to calibrate the first sensor array, and the portion of the second set of survey measurements comprises the survey measurements received when the drilling operation produces a vibration on the drill string of less than a 3 g average vibration.

15. The method of claim 10, wherein the first sensor array and the second sensor array each comprise an accelerometer, a magnetometer, a gyroscope, or any combination thereof.

16. The method of claim 10, wherein the first sensor array comprises two or more sensors of a single type, each of the two or more sensors of the single type comprising a different accuracy range from each other.

17. The method of claim 10, wherein the first sensor array comprises a sensor that is configurable to have multiple ranges, and the sensor is configured to switch between the multiple ranges based on drilling conditions of the drilling operation.

18. A method for correcting a drilling path during a drilling operation, comprising:
    receiving a first set of survey measurements from a first sensor during the drilling operation;
    receiving a second set of survey measurements from a second sensor while a drill bit drills during the drilling operation, wherein the second set of survey measurements has a greater base accuracy than the first set of survey measurements and wherein the first sensor and the second sensor are disposed on a drill string at a same location; wherein receiving the second set of survey measurements occurs while the drilling operation produces a vibration on the drill string of less than a 3 g average vibration;

calibrating the first sensor with the second set of survey measurements from the second sensor; and correcting a drilling path of the drill bit based on the first set of survey measurements after calibrating the first sensor.

19. The method of claim 18, comprising switching from the first sensor to the second sensor to receive the second set of survey measurements, wherein a single measuring point provides both the first set of survey measurements and the second set of survey measurements depending on whether switching from the first sensor to the second sensor has occurred.

20. The method of claim 18, wherein correcting the drilling path comprises instructing the drill bit to change a drilling angle based on the first set of survey measurements received after calibrating the first sensor.

* * * * *